US008767905B2

(12) United States Patent
Neeley et al.

(10) Patent No.: US 8,767,905 B2
(45) Date of Patent: Jul. 1, 2014

(54) COMBINATORIAL HETEROGENEOUS-HOMOGENEOUS REACTOR

(75) Inventors: Gary W. Neeley, Forest, VA (US); James B. Inman, Forest, VA (US)

(73) Assignee: Babcock & Wilcox Technical Services Group, Inc., Lynchburg, VA (US)

( * ) Notice: Subject to any disclaimer, the term of this patent is extended or adjusted under 35 U.S.C. 154(b) by 369 days.

(21) Appl. No.: 12/397,070

(22) Filed: Mar. 3, 2009

(65) Prior Publication Data

US 2009/0225923 A1    Sep. 10, 2009

(51) Int. Cl.
*G21C 1/24*    (2006.01)

(52) U.S. Cl.
USPC .......................................... 376/356; 376/361

(58) Field of Classification Search
USPC ......... 376/354, 347, 361, 368, 383, 186, 356, 376/391, 156, 158, 201, 202
See application file for complete search history.

(56) References Cited

U.S. PATENT DOCUMENTS

| 2,961,391 | A | * | 11/1960 | King ............................... 376/301 |
| 2,999,060 | A | * | 9/1961 | Teitel ............................. 376/212 |
| 3,085,966 | A | * | 4/1963 | Flora .............................. 376/301 |
| 3,136,700 | A | | 6/1964 | Poppendiek et al. |
| 5,596,611 | A | * | 1/1997 | Ball ................................ 376/189 |
| 5,910,971 | A | | 6/1999 | Ponomarev-Stepnoy et al. |
| 6,280,694 | B1 | * | 8/2001 | Mason ........................ 423/239.1 |

FOREIGN PATENT DOCUMENTS

| DE | 1489682 A | 4/1969 |
| GB | 763231 A | 12/1956 |

OTHER PUBLICATIONS

Peterson, Holistic Design: Safety, Reliability, Security and Sustainability for the PB-AHTR, Jan. 2007, University of California, Berkeley, Department of Nuclear Engineering.*
European Search Report dated Nov. 9, 2009 from corresponding EP Application No. EP2136375A1.
English translation of an Office Action dated Jun. 25, 2013 in corresponding Japanese Patent Application No. 2009-055594.

* cited by examiner

*Primary Examiner* — Timothy A Brainard
(74) *Attorney, Agent, or Firm* — Eric Marich; D. Neil LaHaye

(57) ABSTRACT

A combinatorial heterogeneous-homogeneous reactor configuration in which an array or groups of homogeneous fuel assemblies are interlinked together in a heterogeneous lattice. The present invention removes the limitation of a homogeneous reactor by providing a reactor concept that utilizes the inherent advantages of homogeneous fuel elements but in a heterogeneous fuel lattice arrangement that limits the power density of any one homogeneous fuel element and yet forms a reactor arrangement that is capable of producing any product demand of interest. The present invention provides a method for producing medical isotopes by the use of a modular reactor core comprised of homogeneous fuel assemblies arranged in a regular rectangular or triangular pitch lattice. The aqueous fuel solution is contained within individual fuel assemblies that are right circular cylinders clad in corrosion-resistant alloys such as stainless steel, zircalloy, zircalloy alloys, or other metal alloys that are resistant to corrosive fissile environments but preserve neutron economy. The fuel assemblies are supported below by a core plate that is tied directly to the lower reactor support structure. The bottom of each assembly opens into a common plenum area which provides a hydrodynamic communication/coupling path between the individual assemblies in the lattice. The fuel assemblies are supported above by an upper plate that is welded to each assembly tube. The top of each assembly opens to a common upper plenum which provides a means of thermodynamic pressure equalization among the four assemblies in the reactor core lattice.

21 Claims, 15 Drawing Sheets

COMBINATORIAL HETEROGENEOUS-HOMOGENEOUS REACTOR

FIELD AND BACKGROUND OF INVENTION

The invention is generally related to medical isotopes and, more particularly, to a medical isotope production reactor.

Technetium-99m ($t_{1/2}$ 6.02 hr) is the most widely used radioisotope in nuclear medicine, accounting for more than 80% of all diagnostic nuclear medicine procedures. Technetium-99m ($^{99m}Tc$) is almost exclusively produced from the decay of its 66-hour parent $^{99}Mo$. Projected world demand for $^{99}Mo$ by the year 2008 was estimated at approximately 11,000 to 12,000 Ci per week (6 days pre-calibrated). The most common method of $^{99}Mo$ production is based on neutron irradiation in a nuclear reactor of a U—Al alloy or electroplated target enriched to 93 wt % $^{235}U$. After irradiation, the $^{99}Mo$ is extracted from the other fission products by radiochemical methods. Although the specific activity achieved by this method is several tens of kilocuries per gram of molybdenum, large amounts of radioactive wastes are generated as byproducts of the fission process and the problem of long-lived fission product management is the major disadvantage in the production of $^{99}Mo$ by this method.

The use of aqueous homogeneous solution reactors or water boiler reactors presents an attractive alternative to the conventional target irradiation method of producing $^{99}Mo$ in that solution reactors eliminate the need for targets and can operate at much lower power than required for a target reactor to produce the same amount of $^{99}Mo$. Specifically, the use of solution reactors for the production of medical isotopes is potentially advantageous because of their low cost, small critical mass, inherent passive safety, and simplified fuel handling, processing and purification characteristics. These advantages stem partly from the fluid nature of the fuel and partly from the homogeneous mixture of the fuel and moderator.

In general, homogeneous reactor systems are superior to heterogeneous reactor systems in their inherent safety characteristics which arise from their greater radiolytic gas production per energy release, thereby resulting in a considerably larger prompt negative temperature coefficient of reactivity. However, the modularity of heterogeneous reactor systems provides a greater degree of freedom and versatility in the fuel arrangement. If practical methods for handling a radioactive aqueous fuel system are implemented, the inherent simplicity of a heterogeneous-homogeneous combinatorial reactor should result in considerable economic gains in the production of medical isotopes.

The advantages of utilizing homogeneous reactor technology for medical isotope production applications has prompted several countries, including the U.S., Russia, and China, to initiate programs to assess the feasibility of applying this technology on a commercial basis.

U.S. Pat. No. 5,596,611 discloses a uranyl nitrate homogeneous reactor (100 kW to 300 kW) for the production of $^{99}Mo$. The reactor is immersed in a containment pool which serves as a heat removal media for the sensible and decay heat generated in the reactor. The reactor vessel is finned to enhance the heat transfer to the containment pool. The reactor operates in a continuous mode in which the radioactive waste products are recirculated back into the reactor. A portion of the uranyl nitrate solution from the reactor is directly siphoned off and passed through columns of alumina to fix some of the fission products, including $^{99}Mo$, on the alumina. The $^{99}Mo$ and some fission products on the alumina column are then removed through elution with a hydroxide and the $^{99}Mo$ is either precipitated out of the resultant elutent with alpha-benzoinoxime or passed through other columns.

U.S. Pat. No. 5,910,971 discloses a small (20 kW to 100 kW) dedicated uranyl sulfate homogeneous reactor for the production of $^{99}Mo$ which operates in a batch mode for a period of several hours to a week. After shutdown and following a cool-down period, the resultant solution is pumped through a solid sorbent material that selectively adsorbs the $^{99}Mo$. The uranyl sulfate and all fission products not adhering to the sorbent are returned to the reactor vessel. The reactor uses internal cooling coils for heat removal.

Although homogeneous reactor system concepts offer many advantages and greater flexibility for the production of $^{99}Mo$, potential power instabilities, which result from radiolytic bubble formation and thermal agitation, generate reactivity variations that can impair continuous stable operation. As a result, static solution reactor systems are power limited and, therefore, the specific activity of the $^{99}Mo$ achievable, is limited by solution cooling constraints and potential thermal instabilities.

SUMMARY OF INVENTION

The present invention is drawn to a combinatorial heterogeneous-homogeneous reactor configuration in which an array or groups of homogeneous fuel assemblies are interlinked together in a heterogeneous lattice. The present invention removes the limitation of a homogeneous reactor by providing a reactor concept that utilizes the inherent advantages of homogeneous fuel elements but in a heterogeneous fuel lattice arrangement that limits the power density of any one homogeneous fuel element and yet forms a reactor arrangement that is capable of producing any product demand of interest. The present invention provides a method for producing medical isotopes by the use of a modular reactor core comprised of homogeneous fuel assemblies arranged in a regular rectangular or triangular pitch lattice. The aqueous fuel solution is contained within individual fuel assemblies that are right circular cylinders clad in corrosion-resistant alloys such as stainless steel, zircalloy, zircalloy alloys, or other metal alloys that are resistant to corrosive fissile environments but preserve neutron economy. The fuel assemblies are supported below by a core plate that is tied directly to the lower reactor support structure. The bottom of each assembly can open into a common plenum area which provides a hydrodynamic communication/coupling path between the individual assemblies in the lattice. Alternately, the fuel assemblies can be isolated hydrodynamically from one another. The fuel assemblies are supported above by an upper plate that is welded to each assembly tube. The top of each assembly opens to a common upper plenum which provides a means of thermodynamic pressure equalization among the four assemblies in the reactor core lattice.

The present provides a liquid fuel reactor concept where no fuel is circulated outside the core region.

The present invention provides a homogenous fuel element that combines the inherent safety characteristics with a heterogeneous lattice array which limits the power density of any one homogeneous fuel assembly.

The present invention provides a homogeneous fuel element with individual heat removal, reflux condenser, and sweep gas circuits which are modular and removable from the core lattice for maintenance purposes.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawing, forming a part of this specification, and in which reference numerals shown in the drawing designate like or corresponding parts throughout the same.

DESCRIPTION OF THE PREFERRED EMBODIMENTS

Figure 1:
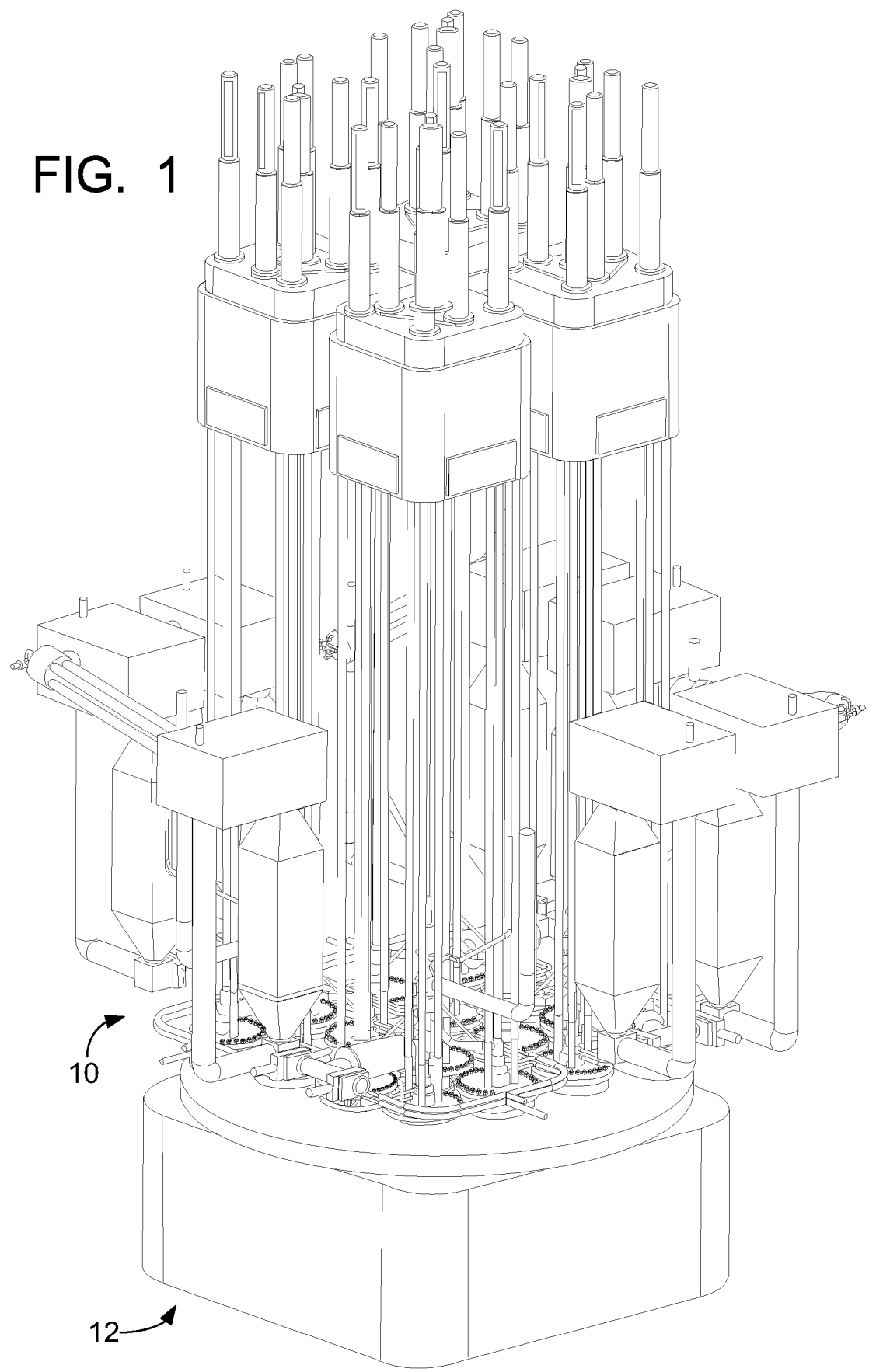
FIG. 1 is a partial cutaway view of the reactor.
Figure 9:
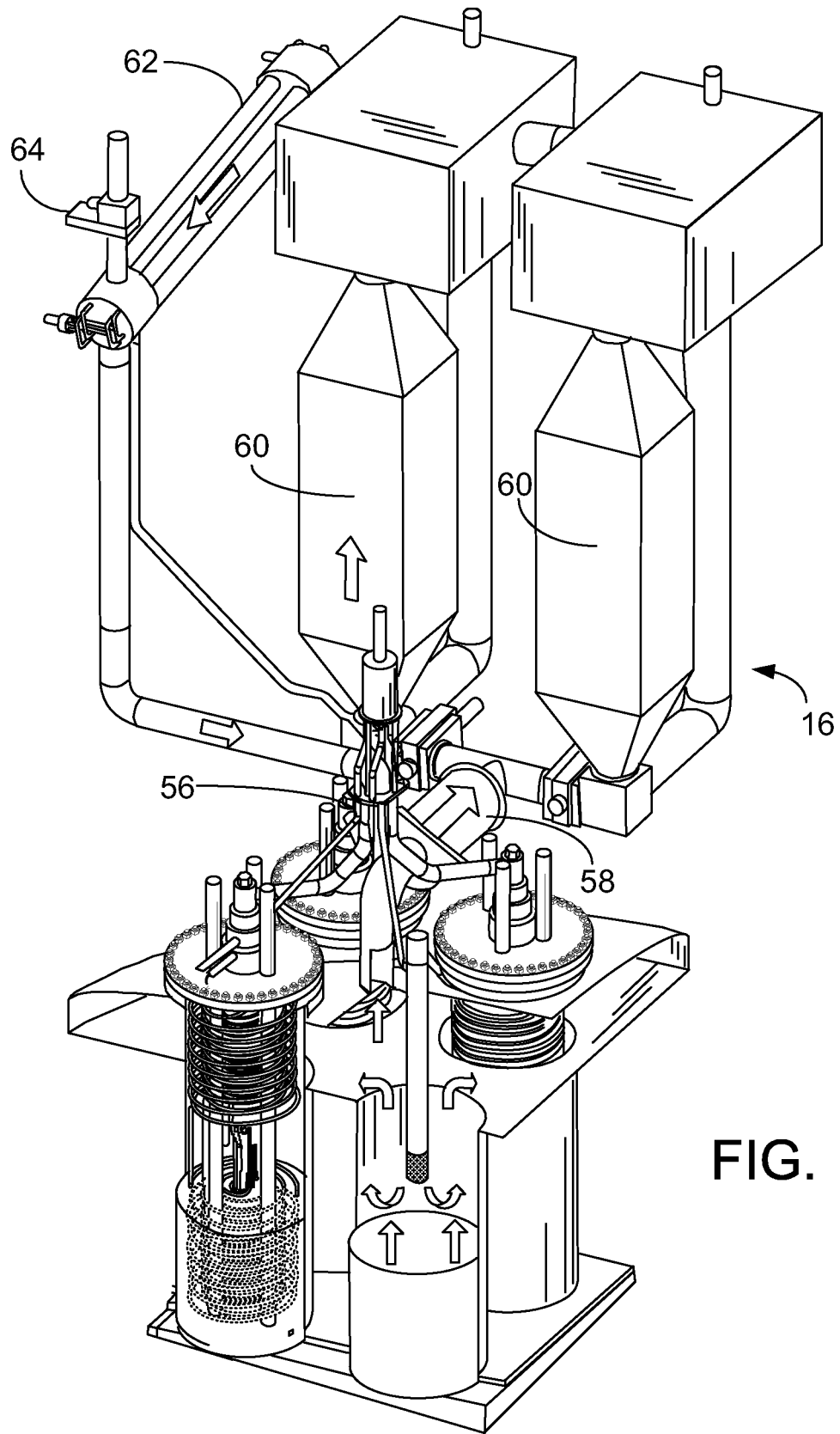
FIG. 9 illustrates the radiolytic gas loop.

As seen in FIG. 1, the invention is generally indicated by numeral 10. The combinatorial heterogeneous-homogeneous reactor arrangement 10 is generally comprised of three major subsystems, namely the reactor core 12, the reactor cooling system 14 (FIG. 6), and the reactor gas management system 16 (FIG. 9). Unlike a reactor with uranium pellets in clad fuel rods used in the production of energy to produce electricity, this medical isotope production reactor uses a liquid fuel solution that circulates through the core.

The reactor core 12 is comprised of a modular heterogeneous lattice such as graphite, beryllium, water, steel or some other neutron reflecting material that minimizes neutron leakage and optimizes neutron economy which has a plurality of removable homogeneous fuel assemblies 18. The fuel assemblies 18 within the lattice are interlinked at a common upper plenum 19 to insure system thermodynamic stability.

Figure 4:
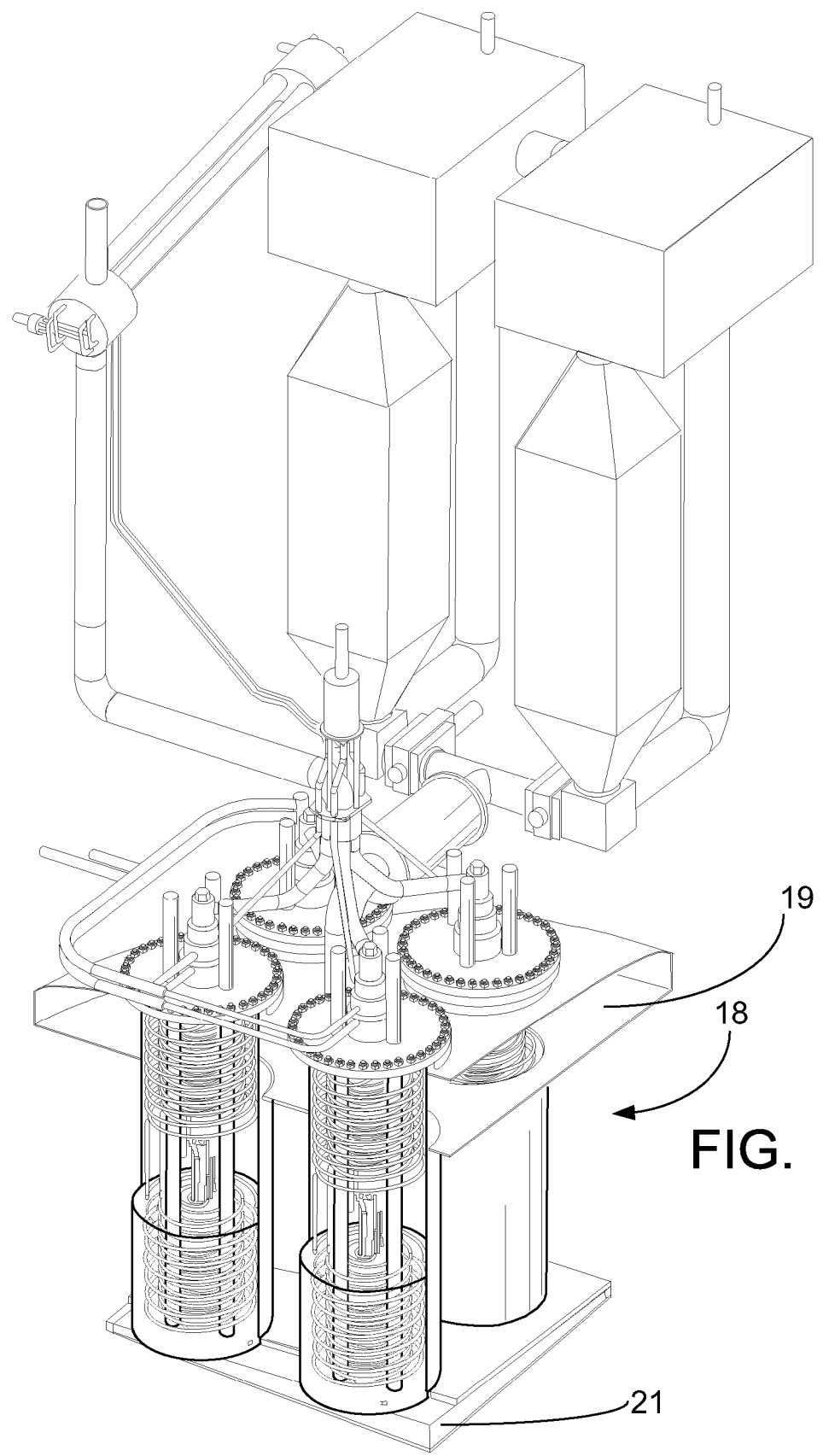
FIG. 4 illustrates more of the details of the square pitch arrangement.

The fuel assemblies 18 are typically grouped into symmetric subunits, as best seen in FIG. 4, which can be interlinked at a common lower plenum 21 to provide a means for promoting free convection circulation among the fuel assemblies 18 in the subgroup of FIG. 4. Alternately, all fuel assembly subgroups may be interlinked through the common lower plenum 21 to allow for free convection circulation and intercommunication of fluid fuel among all of the fuel assemblies 18 through out the core lattice. From this it can be understood that lower plenum 21 is common to a group of symmetric subunits of fuel assemblies in one embodiment and common to all fuel assemblies in another embodiment.

The spacing between fuel assemblies 18 or assembly subgroups and, thus, the amount of interspersed neutron reflecting lattice material such as graphite, beryllium, water, steel, or some other neutron reflecting material that minimizes neutron leakage and optimizes neutron economy between fissile units can be adjusted by design to regulate the desired neutron interaction between homogenous fuel assemblies and, thus, the net design power level and isotope production capability of the reactor.

Figure 2:
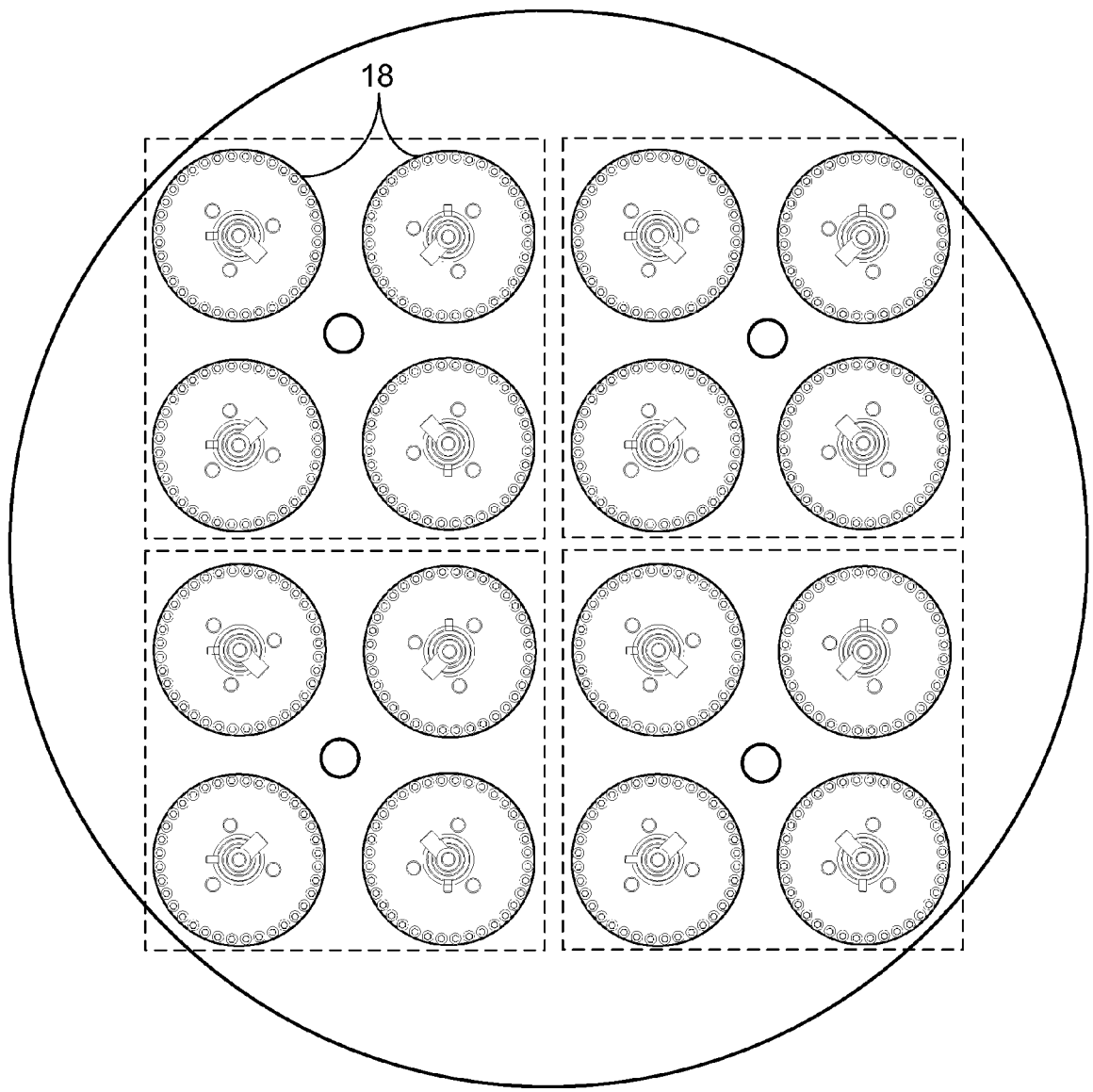
FIG. 2 illustrates a square pitch arrangement of the fuel assembly.
Figure 3:
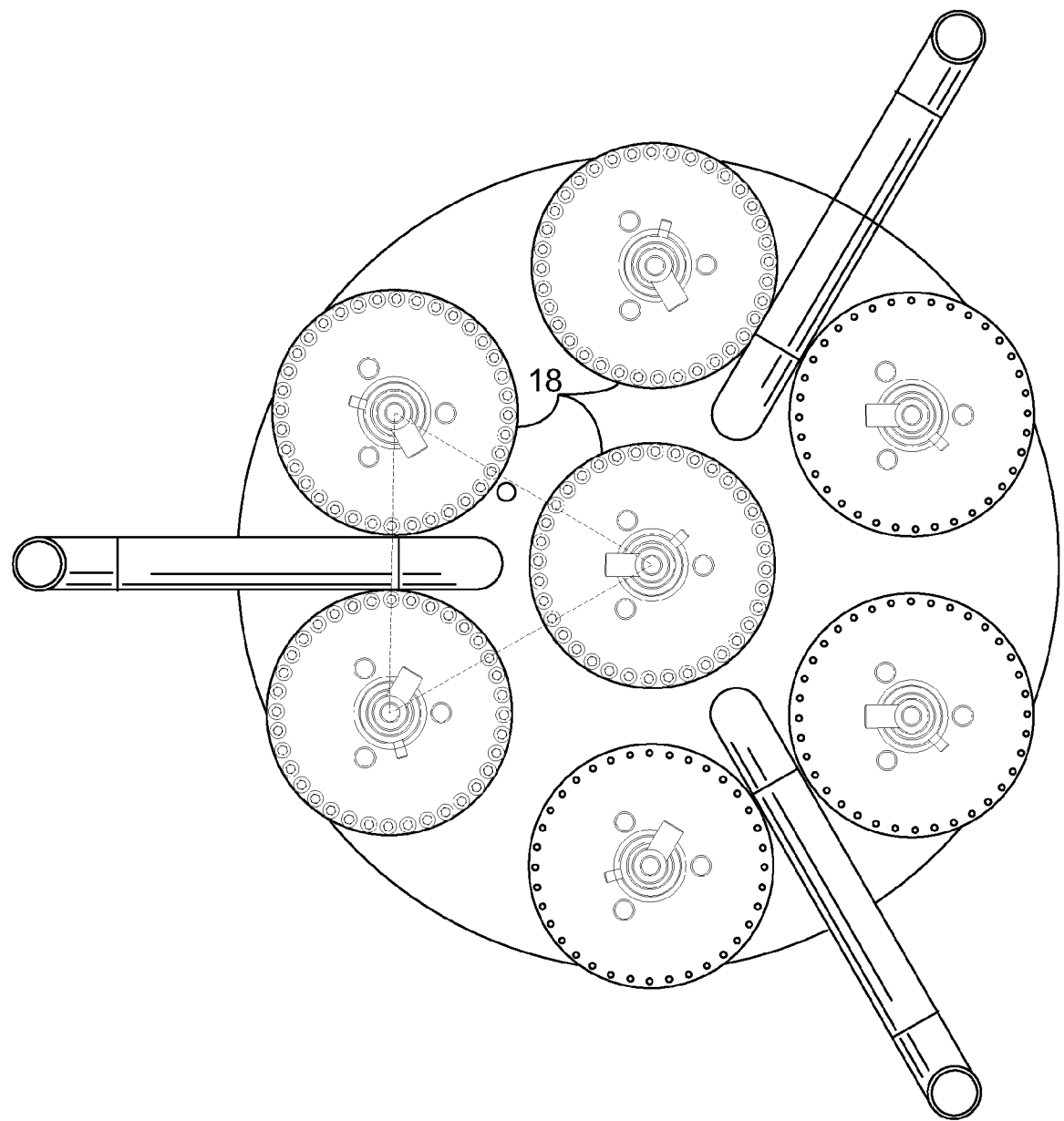
FIG. 3 illustrates a triangular pitch arrangement of the fuel assembly.

The reactor core 12 lattice geometric configurations can be of any regular array such as a rectangular array on a square pitch, a hexagonal array on a triangular pitch, or some other commonly used lattice geometric arrangement. The market demand for the product and, thus, the reactor power level will dictate the number of required fuel assemblies and the lattice configuration. FIG. 2 illustrates a sixteen fuel assembly array on a square pitch where the lattice fuel assemblies 18 are grouped in subunits consisting of four fuel assemblies. FIG. 3 illustrates another lattice pattern in which seven fuel assemblies 18 are arranged on a triangular pitch lattice with a sub-grouping configuration in which one fuel assembly is shared among the three fuel sub-groups.

Regardless of the lattice structure, the individual fuel assemblies 18 within the reactor core 12 are grouped into symmetric subunits with each fuel assembly 18 being a self-contained cylindrical vessel 23 (FIG. 5) which houses the fissile fuel solution.

FIG. 4 illustrates a typical four fuel assembly subunit of a regular array square pitch lattice such as that illustrated in FIG. 1. For ease of explanation and illustration, reference is made to FIG. 5, which illustrates a single homogeneous fuel assembly 18. Each fuel assembly 18 includes the following. Cooling coil circuits 20 in the lower section are immersed in the liquid fuel solution. Reflux condenser circuit 22 in the upper section condenses entrained water vapor and solution spray. Sweep gas circuit 24 dilutes the radiolytic gases to insure that the gas mixture remains below the hydrogen lower flammability limit (<4% by volume $H_2$). A concentric umbilical tube 26 provides a means for cooling water inlet and outlet flow lines 28, 30 for the fission heat removal cooling coils 20 and reflux condenser 22, sweep gas inlet 32, and line 34 used for condensed water return, acid addition, and fresh fuel solution replenishment for each operating cycle. The umbilical tube 26 is welded to the assembly flange 36 which is bolted to the upper dome head structure 38 and so is removable.

Figure 5:
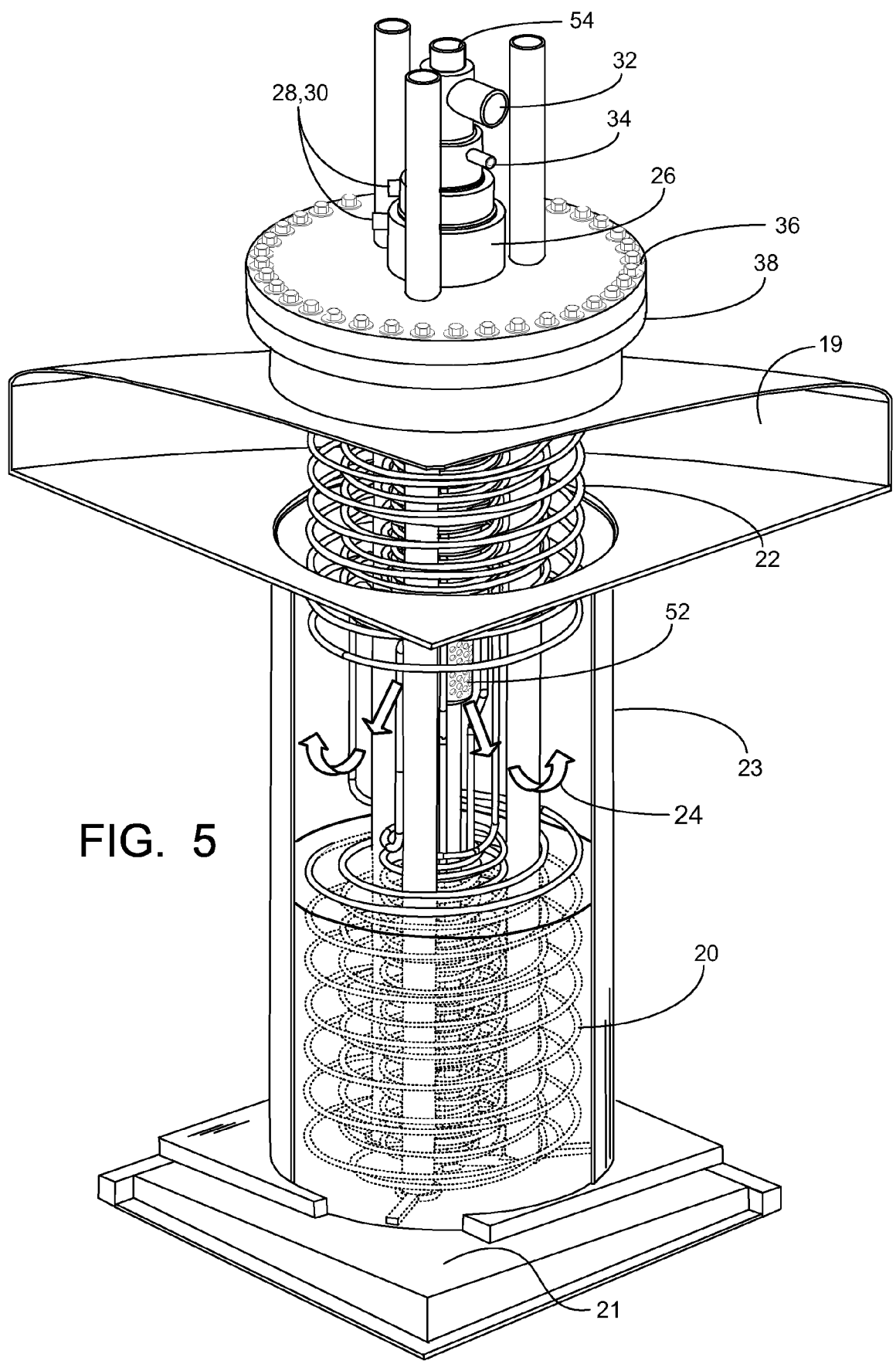
FIG. 5 is a cutaway view of the homogeneous fuel assembly.

The fuel assembly cooling coil circuits 20 shown in FIG. 5 remove sensible and decay heat produced in each homogeneous fuel assembly. The cooling coil circuits 20 are comprised of a series of corrosion resistant tubing sections constructed of material such as stainless steel, zircalloy, or zircalloy alloys, or other metal alloys that are resistant to corrosive fissile environments but preserve neutron economy. The cooling coil circuits comprise a series of either helical, serpentine, or other combinations of curved and straight tubing sections whose number of turns as well as the spatial location are arranged to insure maximal uniform heat removal throughout the fuel assembly with minimal pressure drop. Each coil section can be linked to a corresponding reflux coil condenser circuit 22 in the upper portion of each fuel assembly which serves to condense entrained water vapor and solution spray out of the sweep gas mixture. Condensation of the water vapor and solution spray reduces the deposition of entrained uranium on exposed surfaces of the reactor gas management system. Each cooling and reflux coil condenser circuit 20, 22 is a continuous coil that is welded to a concentric inlet and outlet header 28, 30 housed in the assembly central umbilical support tube 26.

The common upper plenum is designed to provide: (1) a large solution-gas interface to reduce solution entrainment in the solution vapor/radiolytic gases escaping the solution surface; (2) a large volume to accommodate an emergency fluid expansion without affecting the solution-gas interface; and (3) a large volume for the sweep gas to mix, dilute, and cool the radiolytic gas emerging from the fuel solution surface. The individual homogeneous fuel assemblies 18 in each subunit share a common lower plenum 21 with the other fuel assemblies in the subgroup or with all of the fuel assemblies within the lattice as a means for promoting free convection circulation throughout the lattice subgroup or the lattice as a whole. The upper plenum of each homogeneous fuel assembly 18 opens into a common upper plenum 19 shared by all fuel assemblies 18 within the reactor core 12. This insures proper equilibration of the radiolytic and carrier gas emanating from each homogeneous fuel assembly and thereby providing for overall core thermodynamic stability.

Figure 6:
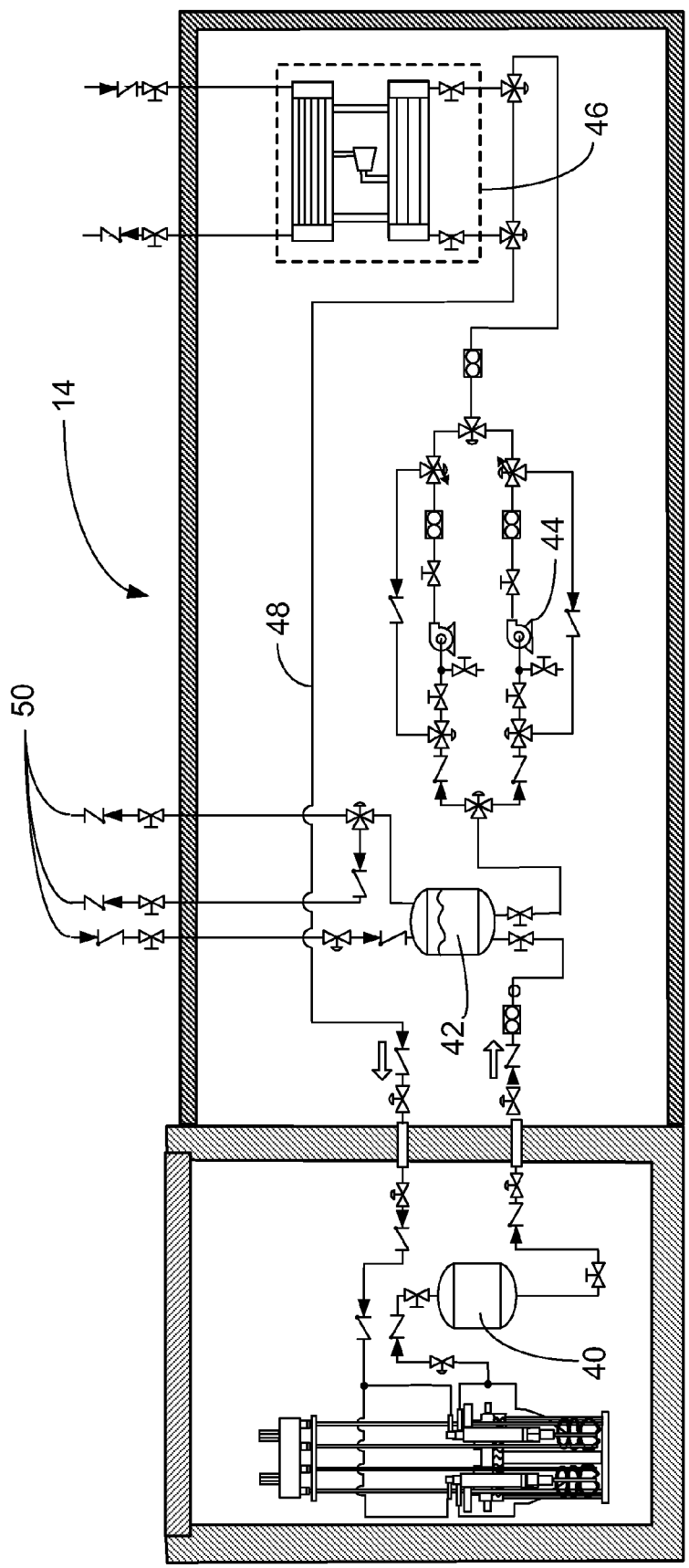
FIG. 6 is a schematic illustration of the closed-loop cooling arrangement.

The reactor core cooling system 14 is schematically illustrated in FIG. 6 and generally comprised of a decay tank 40 for the $^{16}N$ generated by neutron activation of the primary coolant passing through the reactor core 12, a surge tank 42 (on the inlet side of pumps 44) which serves as a coolant reservoir and provides expansion space for the system, redundant, variable-speed, primary coolant pumps 44, and a packaged, high-efficiency chilled water system 46. These components are in fluid communication with each other and the reactor core 12 via fluid lines 48.

The dome of surge tank 42 is swept with air using lines 50 to remove the hydrogen generated from the radiolytic decomposition of primary coolant. The volumetric flow of air is designed to maintain the hydrogen concentration in the air to approximately 2% by volume to prevent a fire hazard.

The packaged chilled water system 46 is designed to maintain the inlet reactor cooling water temperature to the reactor at 4 to 6 degrees Celsius. The flow rate through the reactor core 12 can be varied according to the inlet temperature to maintain the desired differential temperature, thereby accommodating different reactor loadings ranging from decay heat removal to full power operation.

The reactor gas management system 16 is best seen in FIG. 5 and 9 and is designed to provide (1) a dilution gas flow that mixes with the radiolytic gases to insure that hydrogen content in the gas mixture remains below the lower flammability limit and (2) cooling for the radiolytic gas mixture to assist in removal of water vapor, solution spray, and any uranium entrained in the radiolytic gas emanating from the solution surface.

The sweep gas, which can be air, nitrogen, oxygen, or an equivalent, enters the upper portion of each fuel assembly via a perforated nozzle 52. This disperses the gas above the fuel surface (It is seen in FIG. 5 that the level of the liquid fuel solution is at approximately the mid-point of the fuel assembly 18.) in a turbulent pattern to enhance intermixing of the radiolytic gas mixture rising from the fuel surface with the cooler sweep gas exiting the perforated nozzle 52. The nozzle 52 disperses the gas that passes through the concentric umbilical tube 26 from the sweep gas inlet 32 between the central control rod 54 and the umbilical tube 26.

As seen in FIG. 9, the sweep gas inlet header 56 for each subunit of fuel assemblies 18 originates from the outlet of the tube of the reactor gas management system 16.

The reactor gas management system 16, best seen in FIG. 9, is generally comprised of an entrainment trap 58, hydrogen recombiner equipment 60, a gas cooler-condenser 62, a pressure regulating valve 64, and, if necessary, a blower. The radiolytic gas loops from all of the fuel assembly subunits utilize a common radioactive gas disposal arrangement.

The entrainment trap 58 is comprised of a silver activated metal (stainless steel) sponge which removes entrained liquid, iodine vapors, solid radioactive daughters of the fission gas, and activated particulates in the sweep gas. The metal sponge presents a large catalytic surface area for the capture of fission fragments and other particulates. The metal sponge is housed in a metal chamber located on each of the parallel gas lines leaving the reactor and prior to the inlet to the hydrogen recombiner equipment 60.

Figure 10:
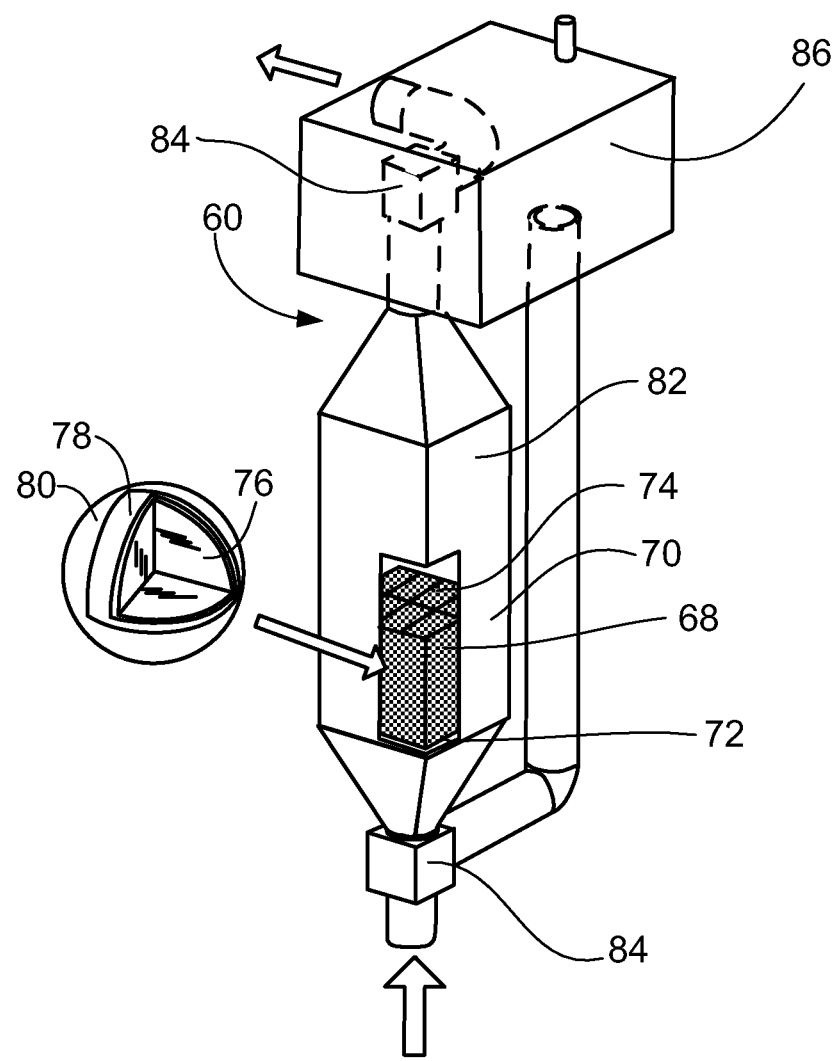
FIG. 10 illustrates the hydrogen recombiner.

The hydrogen recombiner equipment 60 associated with each subunit of fuel assemblies 18 (best seen in FIG. 10 with only one of the parallel units being shown for ease of illustration) recombines hydrogen and oxygen formed by radiolytic dissociation of water in the fuel solution during core operation. Each catalytic chamber is comprised of an axial bed 68 containing catalytic particles encased in a metal housing 70 with a steel shot flashback shield (not seen) on the inlet 72 and exit 74 to the chamber sized to serve as an explosion trap that quenches the hydrogen-oxygen flames at the recombiner inlet and exit and sufficient heat capacity to stop combustion. The axial bed is provided with substrate particles 76 (alumina, carbon, silica, etc.) having a precious metal coating 78 (palladium, platinum, etc.) which serves as the active catalyst. The particles 76 can be wet-proofed with a hydrophobic coating 80, such as Teflon®, which repels water but allows a surrounding envelope of gaseous reactants to be retained on the particle surface.

The gas mixture flow into the axial bed 68 can be driven by a blower not shown or can be used in a natural circulation mode. The natural circulation mode may be assisted by a heater (not shown) at the inlet 72. The heater also serves to remove any residual water not vaporized. The natural circulation mode is also assisted by the extended chimney 82 above the exit 74 of the axial bed 68. In the unlikely event that a hydrogen deflagration/detonation were to occur, the increased pressure would activate pressure relief mechanisms 84 at each end of metal housing 70 to isolate the axial bed 68 and vent the burning contents to a pressure relief container 86, thereby minimizing potential reactivity excursions.

Figure 11:
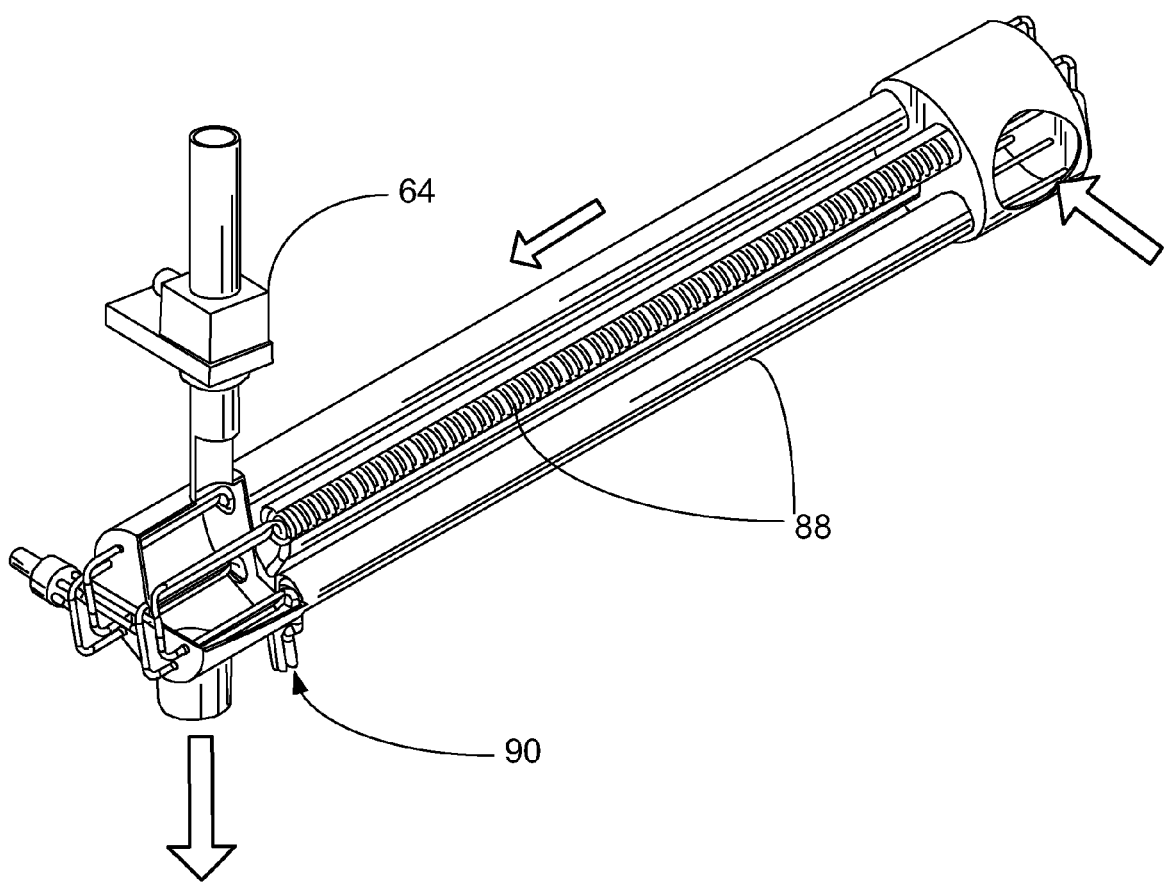
FIG. 11 is a detail view of the cooler/condenser used with the hydrogen recombiner.

The heat of the recombination reaction is removed in the gas cooler-condenser 62, illustrated in more detail in FIG. 11, which is fluid communication with the gas discharge from recombiner 60. Multiple condensing coils 88 are preferably provided with baffles to increase coil surface area and turbulence. The cooler-condensers 62 are configured to provide a gravity drain flow 90 of the condensate back to the reactor 10 to preserve radiolytic mass balance. Depending on the uranyl salt employed as the fuel base, acid addition to the returning condensate flow may be required to insure the pH remains within specification. A pressure regulation valve 64 is used to insure that the reactor pressure remains at its operating value.

Figure 12:
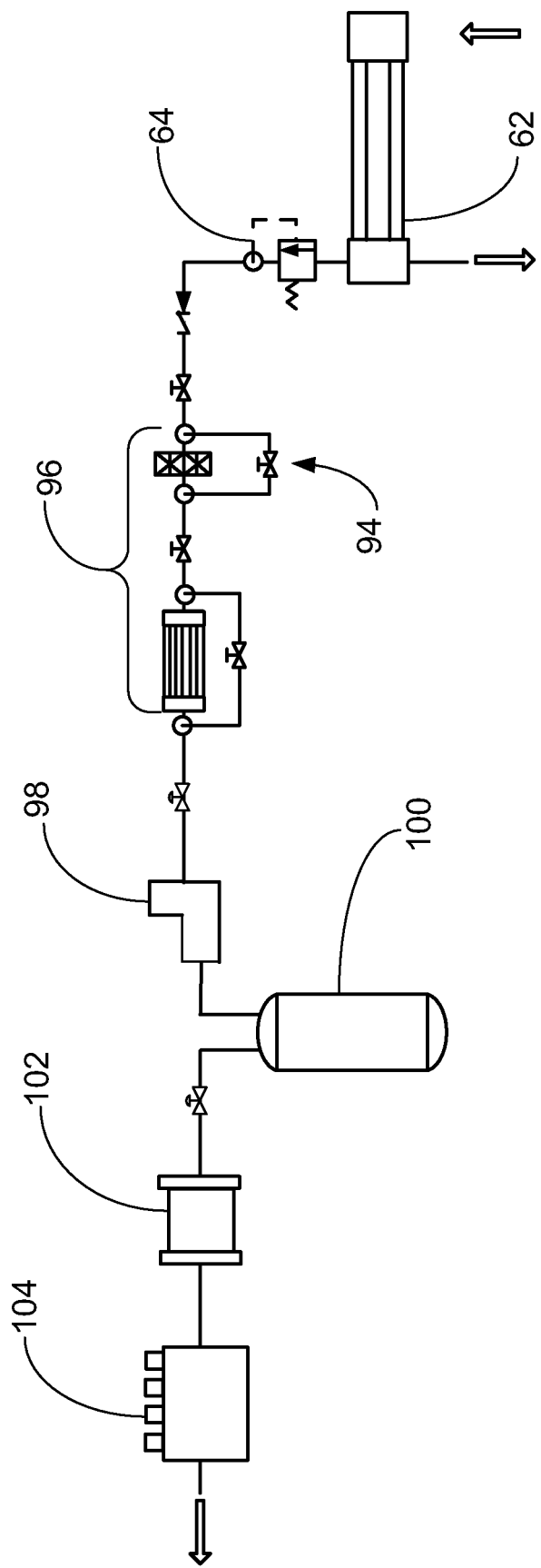
FIG. 12 is a schematic illustration of the pressure regulation and NOx removal arrangement.

A pressure regulating system 94, schematically illustrated in FIG. 12, is optional and contingent on the use of uranyl nitrate as the fuel solution. The pressure regulation valve of the cooler-condenser 62 maintains the reactor gas management system 16 and, therefore, the pressure in the reactor 10 at a constant pressure by bleeding any non-condensable gas to a HEPA filter/charcoal bed 96. The filter bed 96 removes residual iodine in the gas stream which is then compressed by a positive displacement compressor 98 and directed into a noble gas holding tank 100. The air, nitrogen/nitrogen oxide, and noble gas mixture is compressed by use of a positive displacement compressor 98. The contents of the holding tank 100 are eventually discharged to the NOx removal system 102 and radioactive gas disposal system 104 prior to being released to the environment.

The NOx removal system 102 functions to remove residual NOx from the gas mixture, thereby preventing potential corrosion of downstream equipment and acid contamination of the environment.

The radioactive gas disposal system 104 removes radioactive isotopes of xenon and krypton from the gas stream by holding up these noble gases for a time sufficient to permit decay of these isotopes to levels which are permissible for elevated release. The procedure implemented in the concept to remove NOx from the gas stream is to pass the gas mixture through a catalytic bed which contains zeolite or inorganic oxide substrate particles coated with ceria (cerium oxide), silica gel, or the equivalent. The catalytic action of the active coating removes a large percentage of any NOx formed from the radiolytic decomposition of the uranyl nitrate fuel base. The scrubbed gas mixture is then passed to the off-gas system which includes a set of HEPA filters and adsorption beds that contain sufficient quantities of adsorbing material to adsorb all of the xenon and all but krypton-85. The inert noble gas, nitrogen, and oxygen are monitored for radioactive content and released, if within specification, via the stack.

Figure 13:
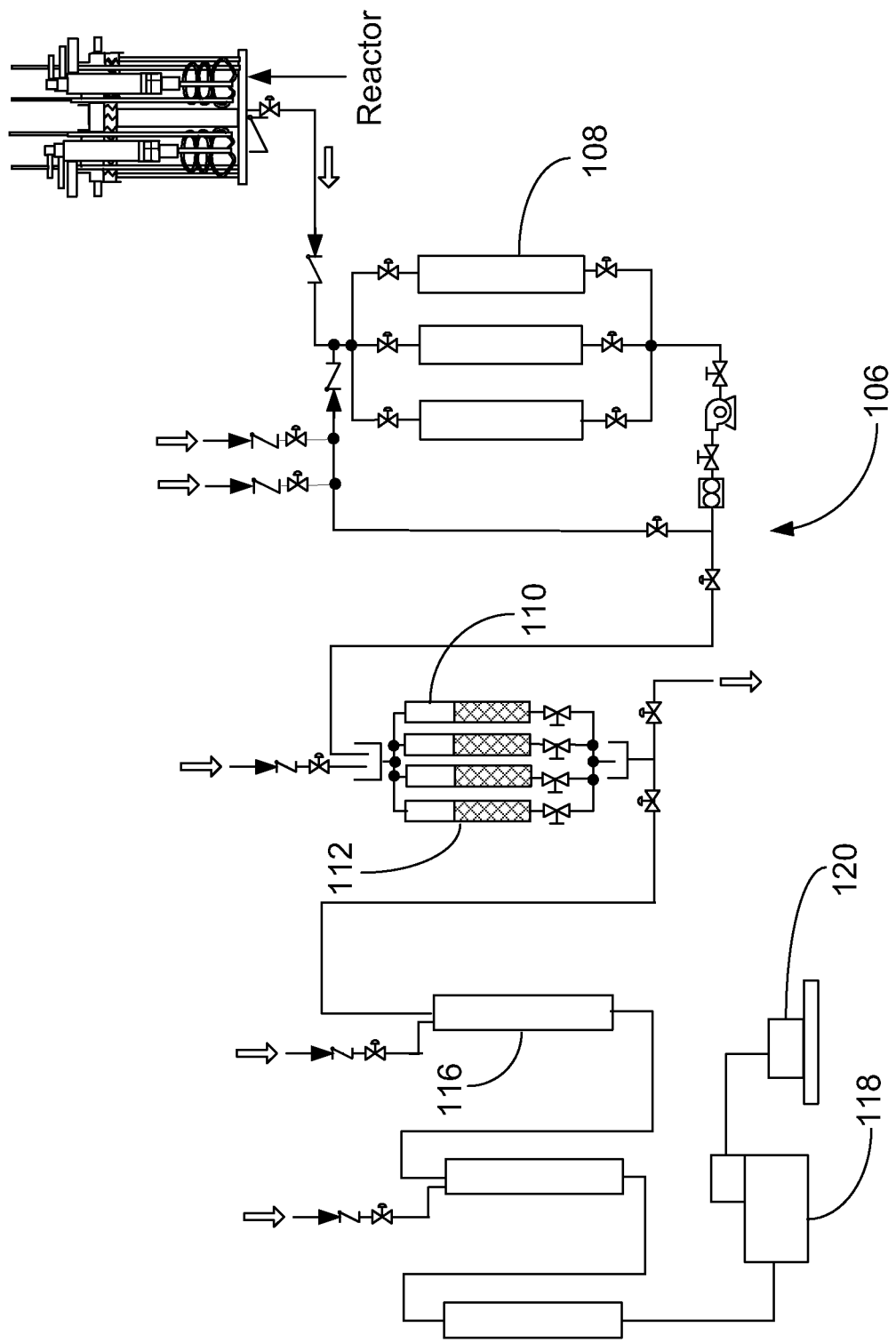
FIG. 13 is a schematic illustration of the $^{99}$Mo processing arrangement.

The $^{99}$Mo processing system, schematically illustrated in FIG. 13, includes a sequence of processing steps in which: the fuel solution, which has been discharged from the reactor after a pre-specified irradiation period, (1) is stored in a first arrangement of columns 108 where the chemical state (fuel concentration, pH, temperature, etc.) of the irradiated fuel solution is adjusted and mixed to insure optimal conditions for high efficiency $^{99}$Mo extraction with a selected sorbent are obtained; (2) is passed through a second arrangement of columns 110 containing an inorganic or a solid polymer sorbent 112 to extract the $^{99}$Mo from the fuel solution; (3) is eluted with a concentrated base solution; and (4) purified with conventional exchange chromatography columns 116 (purification columns). The second columns 110 are connected in such a manner as to allow for parallel processing of the irradiated fuel solution. The sorbent 112 used in second columns 110 (separator columns) is preferably either an inorganic sorbent that is a hydrated metal complex or silver activated carbon or equivalent, or a solid polymer sorbent such as α-benzoinoxime or maleic anhydride copolymer. The piping configuration and valve network is arranged to permit: (1) rinsing of the separation columns 110 with distilled water and/or acid to remove residual reactor fuel solution and trace fission products, and (2) elution of the $^{99}$Mo adsorbed on the separation columns 110 with a strong base (concentrated sodium or ammonium hydroxide) and passed to purification columns 116 (e.g. silver activated carbon/zirconium oxide, etc.) where the trace anions ($^{135}$I, $^{103}$Ru, $^{132}$Te, etc.) are removed. The purified product is then converted to $MoO_3$ by evaporation 118 and certified 120 for product purity. The certified product is then packaged and transported to a $^{99m}$Tc-generator site for integration with the medical dispensing units.

Figure 14:
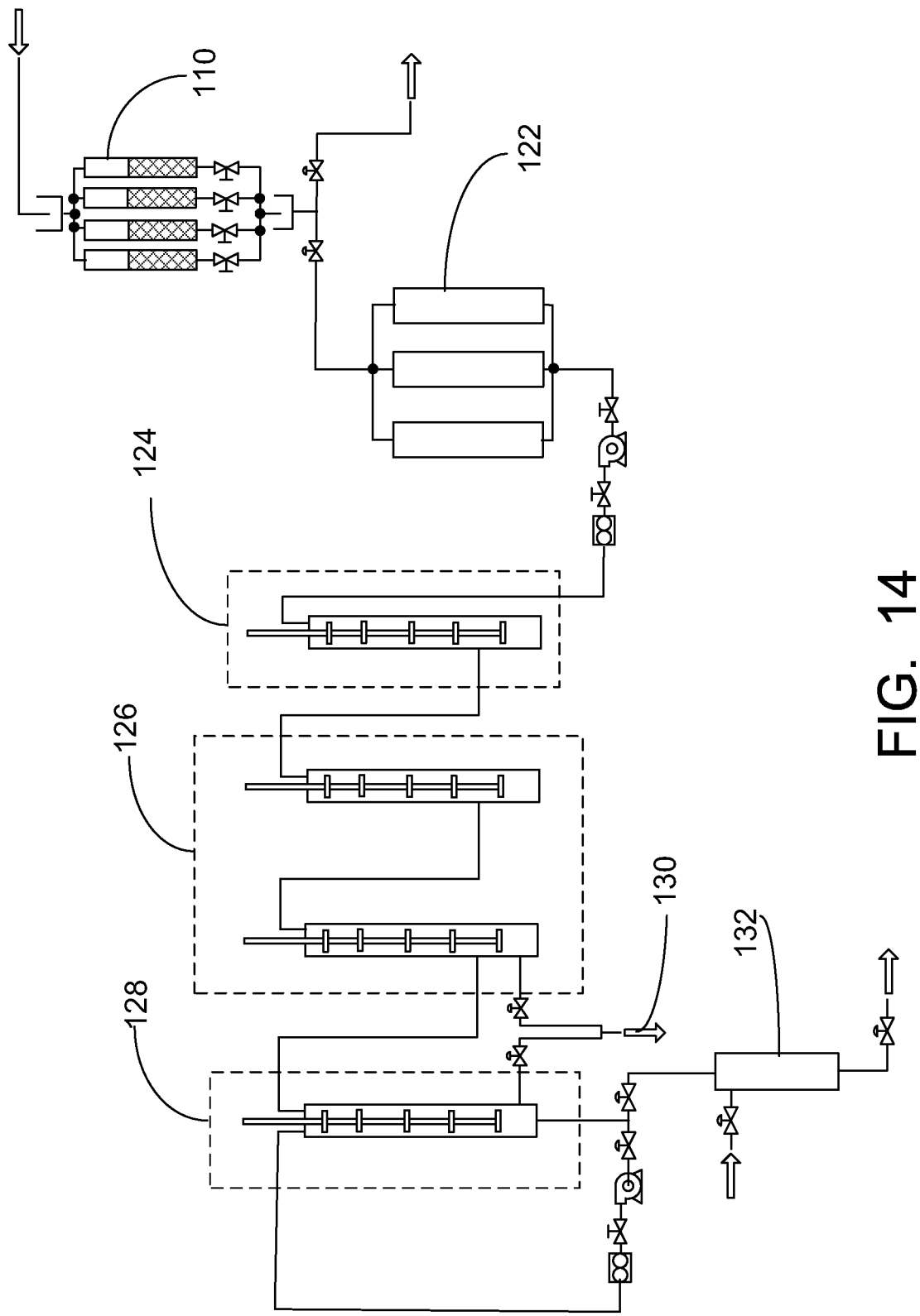
FIG. 14 is a schematic illustration of the fuel cleanup arrangement.

During the $^{99}$Mo processing sequence, the fuel solution is passed through the separation columns 110 and collected in criticality safe storage columns 122 (FIG. 14). The fuel solution is then sent to the fuel cleanup in batch mode to remove the fission product impurities from actinides.

The fuel cleanup arrangement, schematically illustrated in FIG. 14, is comprised of a series of liquid-liquid extraction centrifugal contactors and/or pulse columns which are grouped into extraction 124, scrubbing 126, and stripping 128 sections.

In the extraction section 124 the uranium and plutonium are extracted by multistage countercurrent contact with 30% V/O tributyl phosphate (TBP) in a paraffinic hydrocarbon diluent. Fission products, which have much lower distribution coefficients than uranium and plutonium, remain largely in the aqueous phase and leave the extraction section in the aqueous raffinate. Americium and curium, which are predominately trivalent, are similar to the rare-earth fission products in that they have relatively low distribution coefficients and thus remain in the raffinate 130 with the fission products. Neptunium is partly in the extractable hexavalent state and partly in the pentavalent state. However, in the fuel clean system concept, all the neptunium is converted to the hexavalent state to insure that the plutonium remains with the organic extract. Typically in the extraction section 124 centrifugal contactors are employed to disperse the phases and minimize the holdup, thereby reducing the potential for solvent degradation from intense fission product radioactivity.

In the scrubbing section 126 the small quantities of fission products carried by the organic solvent leaving the extraction section 124 are removed from the organic solvent by countercurrent washing with aqueous nitric acid. The fission product impurities join the aqueous raffinate 130 from the extraction section.

In the stripping section 128 the uranium and plutonium in the organic phase are back extracted to the aqueous by dilute (~0.01M) nitric acid. The organic solvent form is then washed in the wash section 132 successively with 0.2M sodium carbonate and dilute nitric acid to remove trace radiolytic and hydrolytic decomposition products and then reused in the fuel cleanup arrangement.

Figure 15:
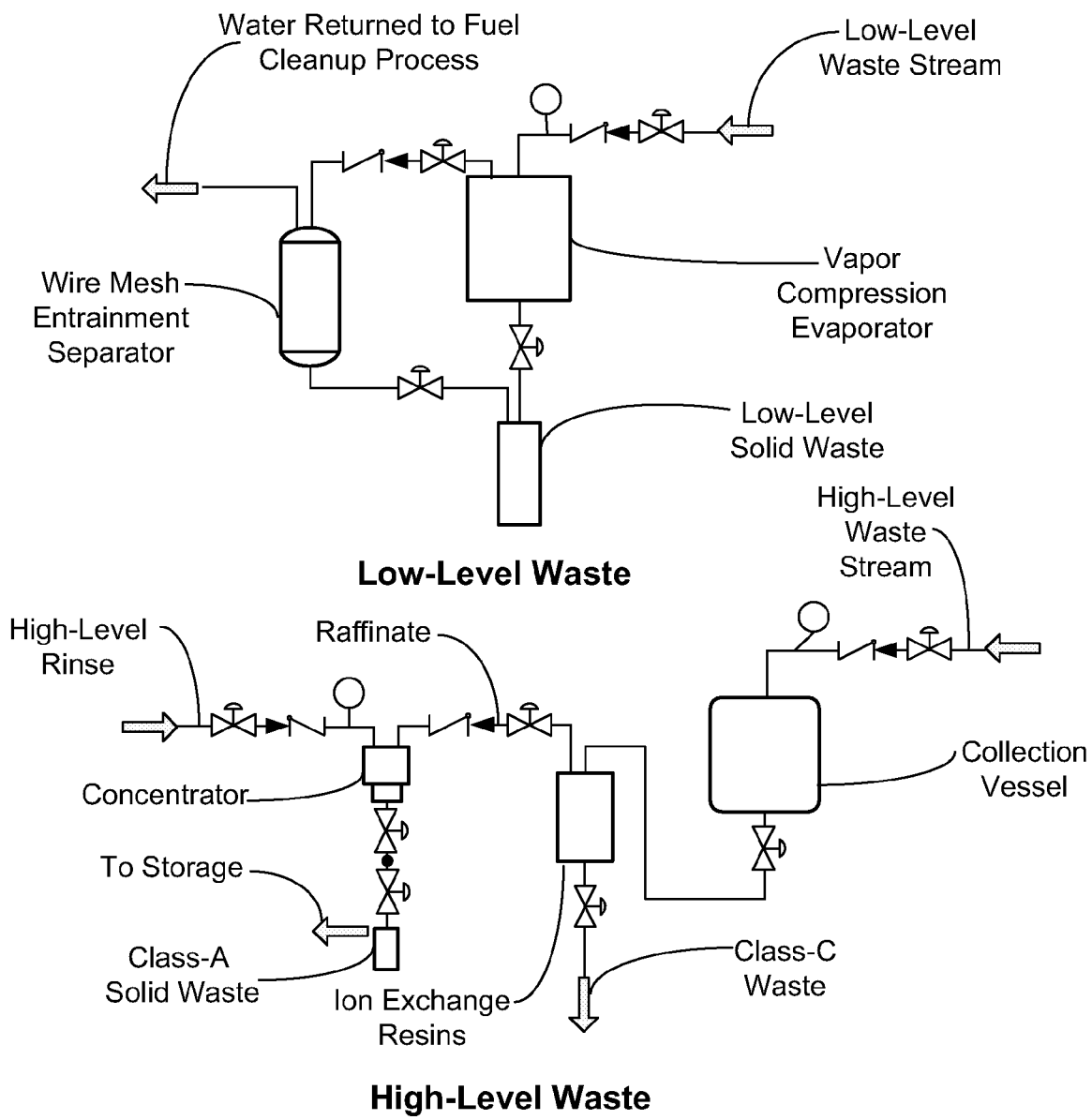
FIG. 15 is a schematic illustration of the waste management/processing arrangement.

The aqueous raffinate stream 130 containing the fission products is passed to an aqueous waste management/processing arrangement schematically illustrated in FIG. 15 that receives many different feed streams that are differentiated primarily by their radioactivity content. The low-level waste streams are typically neutralized, if necessary, and concentrated in a simple flash or vapor compression evaporator to produce low-level waste concentrates and water. The volume of the waste concentrates is contingent on the salt content. Low-salt level waste can be greatly reduced in volume by evaporation without precipitation of the solids, whereas high-salt waste streams can only moderately be reduced in volume. The water is decontaminated (simple wire-mesh entrainment separators achieve a decontamination factor of several thousand) and returned to the fuel cleanup process.

The highly radioactive stream feed to the aqueous waste management/processing arrangement encompasses the bulk of the fission products which reside in the raffinate stream 130 of the fuel cleanup arrangement. This aqueous phase contains many curies per liter and must be cooled to prevent self-boiling. The long term activity of the fission products are segregated into intermediate Class C and low level Class A streams by selectively removing the Cs and Sr from the raffinate stream with ion exchange resins and disposing the resin as Class C waste. The fission products remaining in the raffinate stream are passed to a waste concentrator that concentrates the waste to a concentration level that is commensurate with a stabilization process and disposal as Class A waste. Because of potential self-heating of the fission products, the evaporator and bottom storage tanks are provided with cooling means.

Figure 7:
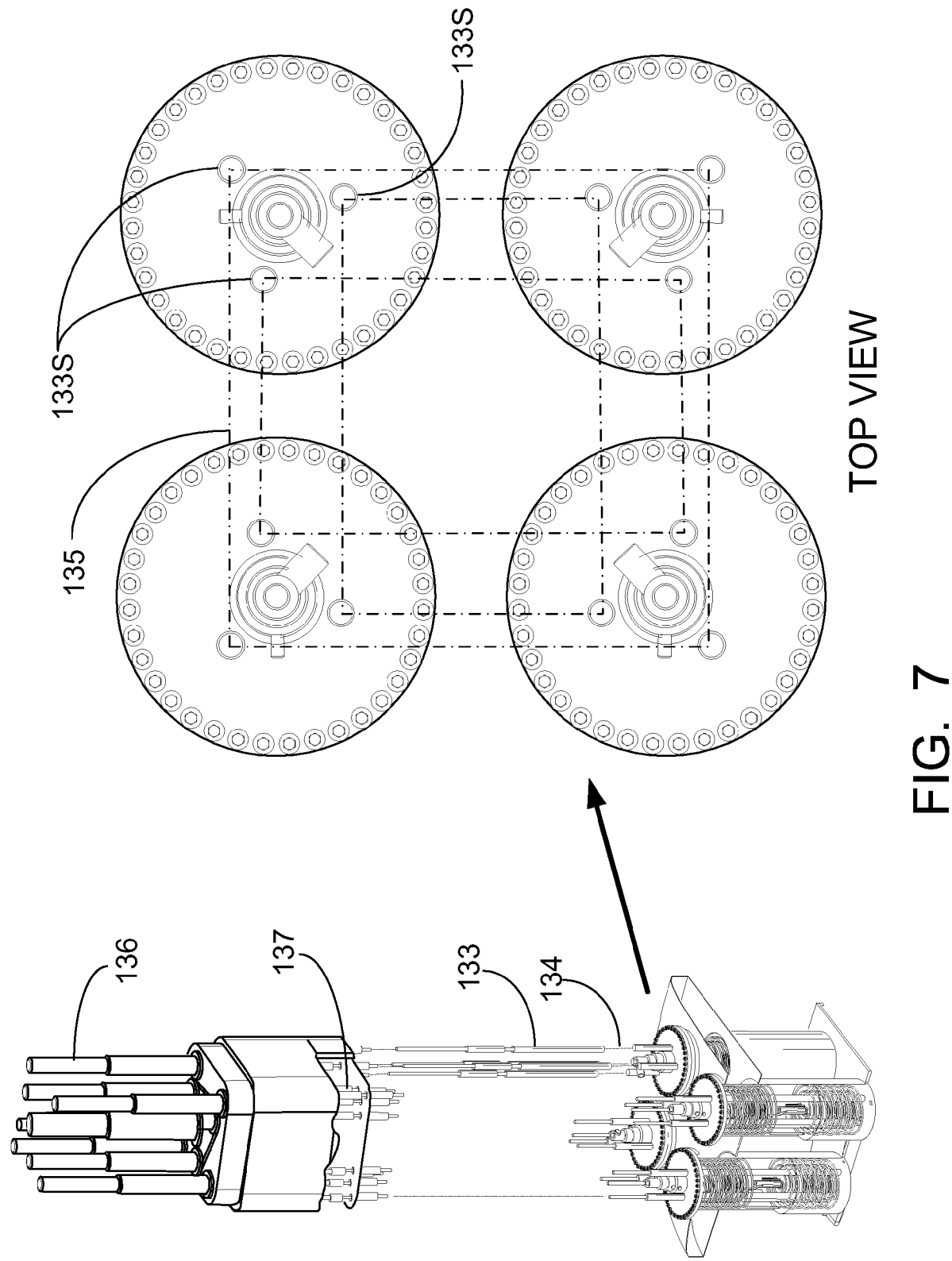
FIG. 7 illustrates the positioning of the control rods.

As best seen in FIG. 7, reactivity control authority for each homogeneous fuel assembly is provided by control rods 133 that are inserted into the fuel solution through thimbles 134 which are sealed at the bottom. Lateral and vertical motion of the thimbles 134 is constrained at the upper and lower plenums 19, 21. Some of the control rods 133 function strictly as safety rods 133S while the remainder of the rods 133 serve as both power regulating/dampening and safety shutdown rods. The control rods 133 in each fuel assembly are clustered with their corresponding control rods 133 in the adjacent fuel assemblies 18 into safety rod and power regulating/dampening groups as illustrated by lines 135. Additionally, the rod clusters for each subunit are arranged in symmetric groups to insure that the core reactivity changes are uniform and symmetric.

All core reactivity changes are performed by adjusting the positions of the rod clusters in fine increments (notch-by-notch). The control rod cluster withdrawal movements are constrained to notch movements by mechanical electrical interlocks with the maximum rod speed being limited. The axial position of each rod cluster is controlled by a rack and pinion drive mechanism, or equivalent, which is actuated through a rear-reduction unit by a reversible, 3-phase, variable reluctance electric motor 136. The control rod drive mechanism and rod element assembly are separate parts that are coupled by a direct current magnet 137 located at the linkage between the cluster drive mechanism and each control rod element. The electromagnets of all control elements are wired so that when a valid scram signal is received, all the electromagnets are de-energized simultaneously, and the control rods fall freely by gravity into the core and then are decelerated for the last two inches by the air cushioning effect of the control rod piston riding in the cylinder formed by the walls of the rod housing.

Figure 8:
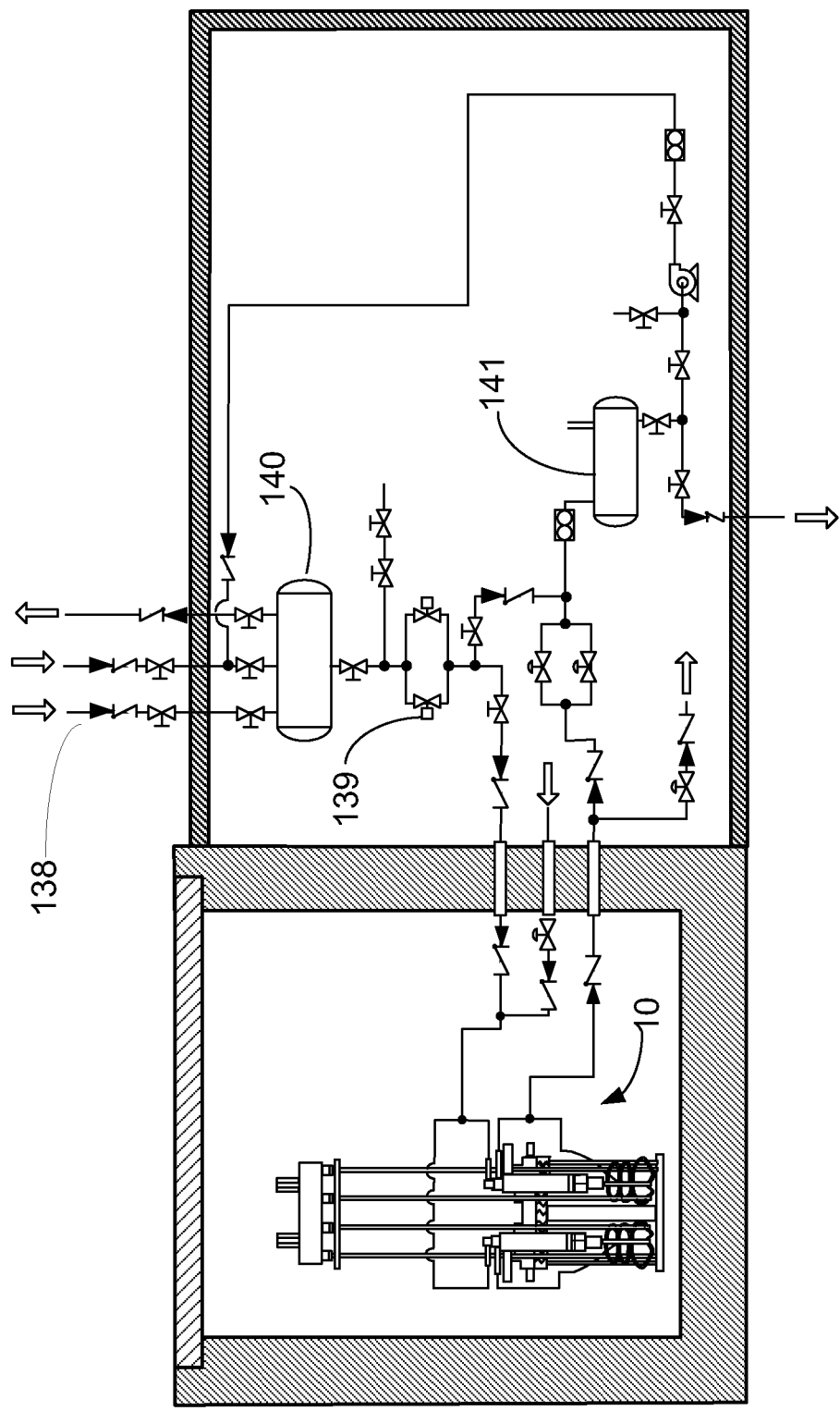
FIG. 8 is a schematic illustration of the secondary shutdown arrangement.

FIG. 8 schematically illustrates a secondary means of bringing the nuclear reactor to sub-criticality and to maintain sub-criticality as the reactor cools. A suitable liquid neutron poison (gadolinium nitrate, sodium pentaborate, etc.) is injected into the cooling coils. The liquid injection makes possible an orderly and safe shutdown in the event that not enough control rods can be inserted into the reactor core to accomplish shutdown in the normal manner. The secondary shutdown arrangement is sized to counteract the positive reactivity effect of shutting down from rated power to cold shutdown condition. The shutdown operation occurs either under pneumatic pressure 138 or an explosively actuated squib valve 139 or a positive displacement pump operating in conjunction with a motor operated injection valve. The secondary shutdown arrangement includes a solution tank 140 containing the neutron poison material, a test water tank 141, and associated local piping, valves, and controls.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

What is claimed as invention is:

1. A liquid fuel combinatorial medical isotope production reactor arrangement, comprising:
   a. a modular reactor core having groups of symmetric homogeneous fuel assemblies interlinked together by a common upper plenum in a heterogeneous lattice arranged in a regular lattice;
   b. an individual and removable cooling arrangement, reflux condenser, and sweep gas circuit for each homogeneous fuel assembly group;
   c. a closed fuel circulation region within the reactor core;
   d. a closed loop reactor cooling arrangement; and
   e. a semi-closed loop radiolytic gas management arrangement being in fluid communication with the upper plenum.

2. The reactor arrangement of claim 1, wherein the fuel assemblies in each of the groups are interlinked by a common lower plenum.

3. The reactor arrangement of claim 1, wherein the fuel assemblies in all of the groups are interlinked by a common lower plenum.

4. The reactor arrangement of claim 1, wherein the fuel assemblies are arranged in a rectangular array lattice.

5. The reactor arrangement of claim 1, wherein the fuel assemblies are arranged in a triangular pitch lattice.

6. The reactor arrangement of claim 1, wherein the upper plenum comprises a disk-shaped housing having flat bottom surface, a flat top surface, an inlet opening for each of the fuel assemblies formed in the flat bottom surface and at least one outlet opening formed in the flat top surface and connected to the semi-closed loop radiolytic gas management arrangement.

7. The reactor arrangement of claim 1, wherein the removable cooling arrangement comprises a tubing coil which extends over each of the fuel assemblies.

8. The reactor arrangement of claim 7, wherein the removable cooling arrangement further comprises an inlet header and an outlet header, wherein the tubing coil and the reflux condenser are connected to form a continuous coil that is in communication with the inlet header and the outlet header.

9. The reactor arrangement of claim 8, further comprising a central umbilical support tube which houses the inlet header and the outlet header.

10. The reactor arrangement of claim 1, wherein the sweep gas circuit comprises a nozzle positioned above the individual and removable cooling arrangement.

11. The reactor arrangement of claim 10, wherein the individual and removable cooling arrangement comprises a tubing coil which extends over each of the fuel assemblies, and the nozzle is centrally aligned with the tubing coil.

12. The reactor arrangement of claim 1, wherein the sweep gas circuit further comprises an entrainment trap in fluid communication with the upper plenum, a hydrogen recombiner upstream from and in fluid combination with the entrainment trap and a gas cooler-condenser upstream from and in fluid combination with the hydrogen recombiner.

13. The reactor arrangement of claim 12, wherein the hydrogen recombiner comprises an axial bed having catalytic particles encased in a housing.

14. The reactor arrangement of claim 13, wherein the housing has an inlet and an outlet.

15. The reactor arrangement of claim 14, further comprising a pressure relief valve positioned at the inlet and the outlet of the housing and a pressure relief container in fluid communication with the pressure relief valves.

16. The reactor arrangement of claim 12, further comprising a gas filtering system in fluid communication with the gas cooler-condenser, the gas filtering system having a filter bed, a positive displacement compressor in fluid communication with the filter bed, a gas holding tank in fluid communication with the positive displacement compressor, a $NO_x$ removal system in fluid communication with the holding tank and a radioactive gas disposal system in fluid communication with the $NO_x$ removal system.

17. The reactor arrangement of claim 1, further comprising a $^{99}$Mo processing system having a first plurality of columns in fluid communication with the reactor core, and a plurality of separator columns containing a sorbent, the plurality of separator columns being in fluid communication with the first plurality of columns.

18. A liquid fuel combinatorial medical isotope production reactor arrangement, comprising:
   a. a modular reactor core having homogeneous fuel assemblies;
   b. an upper plenum which interlinks the fuel assemblies in a heterogeneous lattice, the upper plenum having a disk shaped housing with a flat bottom surface, a flat top surface, an inlet opening for each of the fuel assemblies formed in the flat bottom surface and at least one outlet opening formed in the flat top surface;
   c. a cooling arrangement, reflux condenser, and sweep gas circuit for each of the homogeneous fuel assemblies;
   d. a closed fuel circulation region within the reactor core;
   e. a closed loop reactor cooling arrangement; and
   f. a semi-closed loop radiolytic gas management arrangement being in fluid communication with the outlet opening of the upper plenum.

19. The reactor arrangement of claim 18, wherein the fuel assemblies are interlinked by a common lower plenum.

20. The reactor arrangement of claim 18, wherein the removable cooling arrangement comprises a tubing coil which extends over each of the fuel assemblies, the sweep gas circuit comprises a nozzle positioned above the individual and removable cooling arrangement, the nozzle being centrally aligned with the tubing coil.

21. A liquid fuel combinatorial medical isotope production reactor arrangement, comprising:
   a. a modular reactor core having groups of symmetric homogeneous fuel assemblies interlinked together by a common upper plenum in a heterogeneous lattice arranged in a regular lattice, wherein the common upper plenum links together at least two individual symmetric fuel assemblies;
   b. an individual and removable cooling arrangement, reflux condenser, and sweep gas circuit for each homogeneous fuel assembly group;
   c. a closed fuel circulation region within the reactor core;
   d. a closed loop reactor cooling arrangement; and
   e. a semi-closed loop radiolytic gas management arrangement being in fluid communication with the upper plenum.

\* \* \* \* \*